United States Patent [19]

Yefsky et al.

[11] 4,169,624
[45] Oct. 2, 1979

[54] FRONT MOUNTING VEHICLE RADIO

[75] Inventors: Howard Yefsky, South Hackensack, N.J.; Aaron Hirsh, Deer Park, N.Y.

[73] Assignee: Howard Yefsky, Glenview, Ill.

[21] Appl. No.: 916,195

[22] Filed: Jun. 16, 1978

[51] Int. Cl.² .............................................. B60R 11/02
[52] U.S. Cl. .................................. 296/37.12; 248/27.1
[58] Field of Search ................. 180/90; 296/37.12, 70, 296/37.1, 37.8; 85/3 S, 41; 248/27.1, 342, 343, 344

[56] References Cited
U.S. PATENT DOCUMENTS

| | | | |
|---|---|---|---|
| 1,373,188 | 3/1921 | Goewey | 85/3 S |
| 1,504,613 | 8/1924 | Ferguson | 296/37.12 X |

Primary Examiner—Joseph F. Peters, Jr.
Assistant Examiner—Michael Mar
Attorney, Agent, or Firm—Bauer & Amer

[57] ABSTRACT

An improved radio and/or radio tape player combination that is readily mounted in a dashboard from the same convenient position in front thereof in which it is operated or played, but yet is not susceptible to theft by being merely disconnected from the dashboard, due to a transversely oriented front housing incorporated in the construction thereof. The housing, as explained in greater detail subsequently, serves as an effective compartment-bounding structure for the advantageous internal placement of the mounting bolts which attach the radio to the dashboard; the bolts, as a result, being readily masked from view and otherwise rendered difficult to be tampered with.

3 Claims, 8 Drawing Figures

FRONT MOUNTING VEHICLE RADIO

The present invention relates generally to improvements for a vehicle radio, and more particularly to a front-mounting radio, i.e. one inserted from a position in front, rather than from the rear, through the dashboard supporting same, and yet having the same degree of security against theft and tampering as a conventional rear-mounting radio.

As understood, a vehicle radio that can be mounted from the front of its supporting dashboard, thus avoiding such inconveniences as requiring the removal of a portion of the dashboard and that the installer work in a cramped, inaccessible area behind the dashboard, and in such awkward body positions to gain access to such area, enjoys a preference over the conventional rear-mounting radio that cannot be seriously questioned. However, heretofore, the same ease and facilitated installation procedure that would characterize a front-mounting radio, as just generally defined, also renders it vulnerable to tampering and unauthorized removal. That is, merely untightening the bolts fastening the radio to the dashboard and reversing the insertion direction movement, could allow unauthorized removal of the radio, and it is undoubtedly for this reason that front-mounting radios have not replaced the presently more popular, conventional, more difficult to install rear-mounting radios.

Broadly, it is an object of the present invention to provide an improved front-mounting vehicle radio overcoming the foregoing and other shortcomings of the prior art. Specifically, it is an object to provide a vehicle radio which, while mounting from the front using bolts projected through the dashboard, after such facilitated installation is not noticeably different from a conventional rear-mounting radio, particularly as regarding the location and accessibility to the mounting bolts preparatory to removal of the radio, thus contributing to such radio the same degree of security against theft and the like as a conventional radio.

More particularly, intended for a vehicle having a dashboard bounding an opening for mounting a radio in an accessible position for being operated from within said vehicle, an improved radio demonstrating objects and advantages of the present invention is, as noted, one that is adapted to be mounted in said dashboard mounting opening from said radio-operating location within said vehicle. To effectively achieve this objective, the radio includes wall means bounding two separate compartments operatively arranged in T-shaped relation to each other for housing the cooperating components of the radio. In the mounting of the radio there is provided at least two spaced apart radio-mounting bolts extending rearwardly from one said compartment in parallel relation on opposite sides of the other said compartment, such that for completing the attachment of the housing to the dashboard the compartment between the bolts and the bolts assume an operative position projected rearwardly through the dashboard mounting openings. Most significant, the radio-mounting bolts are operatively located internally within said one compartment, whereby access to these mounting bolts incident to any unauthorized tampering therewith is effectively minimized.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 2:
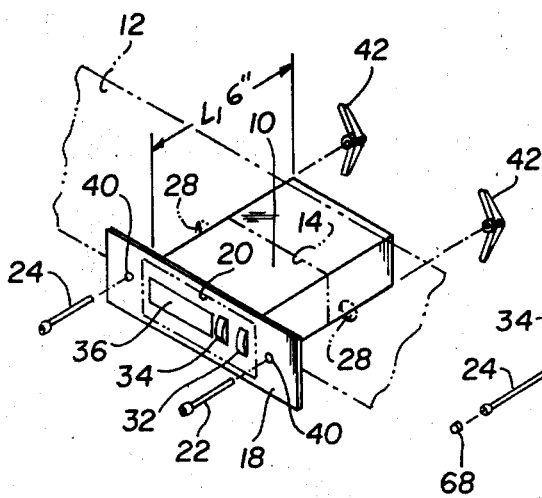
FIG. 2 is a perspective view illustrating a prior art or non-inventive way of alternately supporting the vehicle radio from the dashboard, not from the rear as illustrated in FIGS. 1A and 1B, but from the front as also comtemplated by the within improved vehicle radio.
Figure 3:
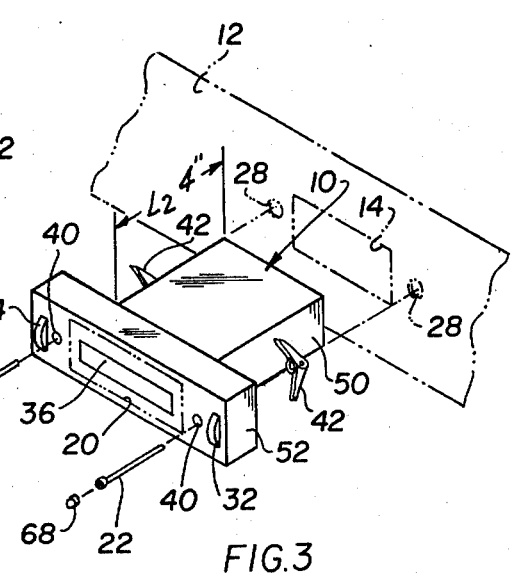
FIG. 3 is a perspective view, similar to FIG. 2, illustrating the within improved vehicle radio which, as noted, is mounted from the front of the vehicle dashboard but which, despite the ease of mounting thereof, is nevertheless desirably very difficult to remove unless such removal is authorized.
Figure 4A:
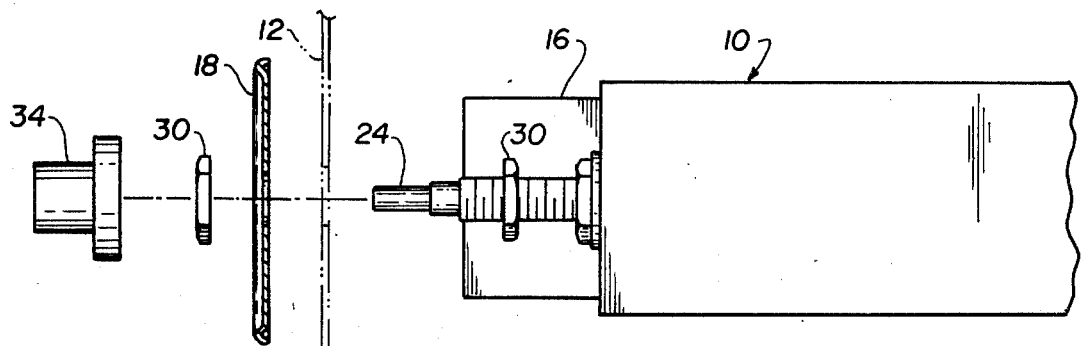
Figure 4B:
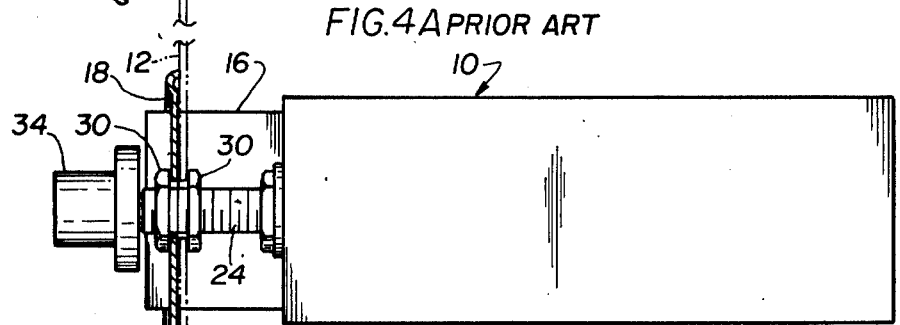
Figure 5:
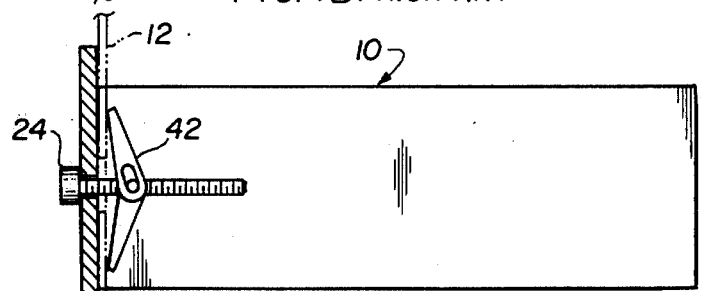
Figure 6:
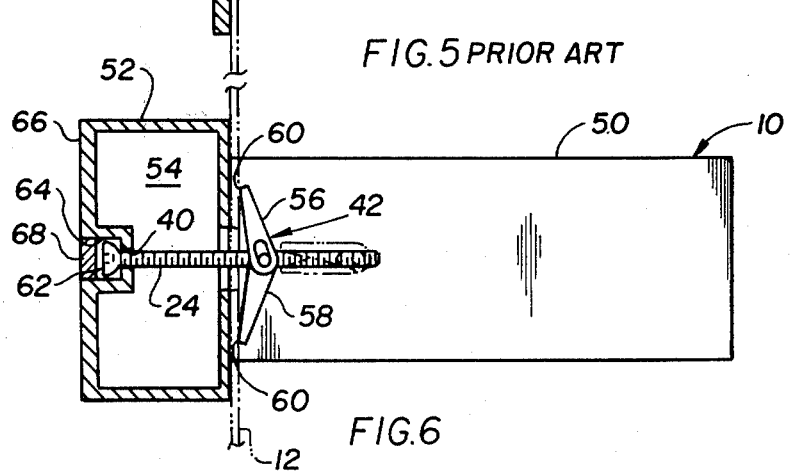

FIGS. 4A, 4B and 5 and 6 are all side elevational views taken in longitudinal section of the corresponding perspective view of FIGS. 1A, 1B, 2 and 3. More particularly, FIGS. 4A and 4B are respectively side elevational views of FIGS. 1A, 1B in which further structural details are illustrated. FIG. 5 is a side elevational view that is related to FIG. 2. The remaining FIG. 6 is a side elevational view that is related to FIG. 3 and thus illustrates further structural details of the inventive improved front mounting vehicle radio hereof.

Figure 1A:
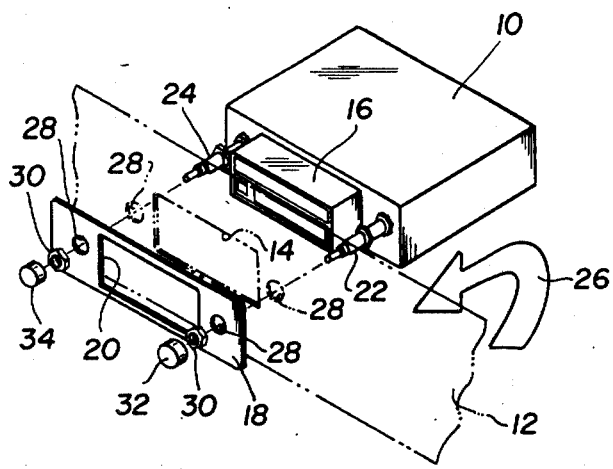
FIGS. 1A and 1B are perspective views of a typical prior art vehicle radio that is conventionally mounted from the rear of the dashboard, FIG. 1A being an exploded view thereof and FIG. 1B illustrating said radio in its supported condition attached to said vehicle dashboard.
Figure 1B:
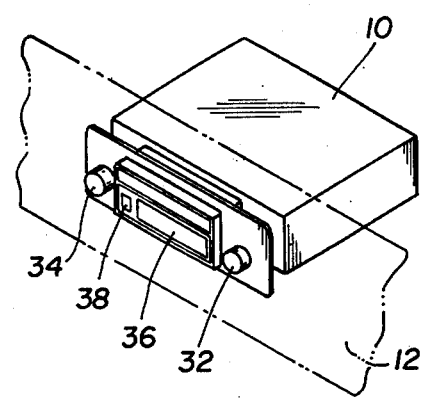

The novel and inventive aspects of the improved vehicle radio of FIGS. 3 and 6 hereof are both better understood and appreciated by first considering what is available in the prior art, such prior art being exemplified by the "rear-mounting" vehicle radio, generally designated 10, illustrated in FIGS. 1A and 1B. That is, as the name implies, the vehicle in which radio 10 is utilized typically has a dashboard 12 provided with an opening 14 appropriately shaped and sized to receive in projected relation therethrough a housing compartment 16 of the radio in which there are typically stored those components providing the radio with its station selector, frequency scale, and other typical operating parameters. Also, typically provided is an escutcheon plate 18 having an opening 20 of similar size and shape as opening 14 and, in its contemplated operative position, supported on the dashboard 12 in alignment with such opening. Protruding forwardly from the radio 10 and in operative connection internally with the components thereof are rotatable shafts 22 and 24 for respectively adjusting the volume, and of moving the station selector along the frequency scale. As demonstrated by arrow 26, to mount radio 10 in its supported condition on the dashboard 12 compartment 16 is projected through the aligned openings 14 and 20 from the rear of the dashboard which, of course, has the desired effect of projecting the shafts 22 and 24 through aligned bolt-sized openings individually and collectively designated 28. Once the shafts 22 and 24 and the compartment 16 are projected within their cooperating openings, it is contemplated that bolts 30 will be threadably engaged on the projected ends of the shafts 22 and 24 and tightened to firmly hold the radio 10 in place behind the dashboard 12 and thus against cooperating bearing surfaces or bolts 30. To complete the prior art mounting of the radio 10, knobs 32 and 34 are placed on the protruding ends of the shafts 22 and 24 to facilitate rotation of the shafts in providing the adjustment in the ratio volume and in the station selection that is required during operation of the radio. This is illustrated in FIG. 1B in which it is also illustrated that the compartment 16 may include means defining a cassette compartment 36 and other like controls, generally designated 38, such as may provide selection between AM and FM operation, or otherwise be related to advanced and improved features of vehicle radios. The foregoing reference to "advanced and improved features" notwithstanding, FIGS. 1A and 1B, and FIGS. 4A and 4B clearly illustrate how the radio 10 is mounted in its supported condition on the dashboard 12 by movement thereinto rearwardly of said dashboard and how such directional mounting movement, among other shortcomings, requires that there be sufficient room made behind the dashboard for the radio 10, and that the installer work in such cramped space and usually in such awkward body positions in order to gain access to the area behind the dashboard preparatory to the placement of the radio in attached condition thereto, that the installation of the radio 10 is very difficult and complicated.

FIG. 2, like FIGS. 1A and 1B, also illustrates a prior art technique for mounting a radio in a vehicle wherein parts similar to those already described in connection with FIGS. 1A and 1B are designated by the same reference numeral. FIG. 2 differs from FIGS. 1A and 1B, however, in that the radio 10 is mounted in dashboard 12 from the front, but still not in a manner which constitutes an adequate solution to the prior art shortcomings. The reason is that in contemplating the front mounting for the radio 10 in order to facilitate its placement in supported condition on the dashboard 12, said front-mounting technique as illustrated in FIG. 2 has no capability of preventing, also in a facilitated and readily simple manner, the unauthorized removal of the radio. Stated another way, at least in the prior art rear-mounted radio 10 of FIGS. 1A and 1B it is not possible to remove the radio merely by removal of the knobs 32, 34 followed by the unthreading of the nuts 30 since it is still required that the radio be eased out of aligned mounting openings 20, 14 rearwardly of the dashboard 12 preparatory to its removal from the vehicle. That is, reverse direction removal (as for example in reference to mounting direction 26) requires an extent of time and knowledge which discourages unauthorized tampering with and removal of the radio 10. This, however, is not the case with the front-mounting prior art radio 10 as illustrated in FIG. 2, and thus such radio does not constitute an adequate solution to the problem, all as will now be explained.

More particularly, the prior art radio illustrated in FIG. 2 includes a housing 10 to which there has been attached in transverse relation the equivalent of the escutcheon mounting plate 18. Because plate 18 extends on opposite sides of the housing 10 all of the stored components thereof must be located adjacent the front opening 20 of housing 10 so that operative connections can be made to the radio components within the radio main housing. In other words, volume and station selection knobs 32, 34 and the cassette opening 36 must, of course, be located within the area 20 in order to facilitate the connection thereof to the appropriate component located rearwardly thereof within the radio housing 10. Because all of the components must be confined within and rearwardly of area 20 this typically would require a length of six inches in the rearward dimension L1 of the radio housing 10. The significance of this will soon be apparent.

In providing the radio 10 of FIG. 2 with its mounted position in the dashboard 12 from the front thereof, housing 10 is projected through the dashboard opening 14 from a starting position that is correspondingly in front thereof. This will bring the lateral extensions of the plate 18 and, more particularly, openings 40 therein, in an aligned position adjacent to the bolt openings 28. Located on the rear threaded ends of the bolts 22, 24 are butterfly connectors 42 which, in a well understood manner, are readily eased through the openings 28 by compression of springs therein and when passing through such openings then are spread apart by these same springs thereby obviating inadvertent retraction in a reverse direction back out through the openings 28. As a consequence, it is possible to rotate the mounting bolts 22, 24 from the front of the dashboard 12 and in this manner draw up on the butterfly connector 42 until these connectors are drawn firmly in gripping contact against the rear surface of the dashboard 12 and thereby hold the radio 10 firmly in place. No matter how firmly radio 10 is held in place, however, it should be readily apparent that merely by reversing direction of the mounting screws or bolts 22, 24 it is readily possible to disconnect the radio from the dashboard 12. Further, once disconnected, it is a simple matter to remove the radio 10 by easing it out of the opening 14 in the same way that it was readily eased into and through such opening. Thus, while the radio 10 of FIG. 2 is of a desirable front-mounting type, it is highly susceptible to unauthorized tampering and theft and for this reason is not a practical and adequate solution to the problems associated with the rear-mounting of vehicle radios as exemplified by the radio of FIGS. 1A, 1B, 4A and 4B.

Reference should now be made to FIGS. 3 and 6 illustrating an improved vehicle radio which provides the ease of mounting attributable to the capability of placing the same in its mounted condition to a dashboard from the front thereof, thereby overcoming the shortcomings of the radio of FIGS. 1A and 1B, but which is not susceptible to unauthorized tampering and removal which, as just noted, is a significant shortcoming and defect in the prior art radio of FIG. 2. The improved vehicle radio illustrated in these figures, generally designated 10, includes a main housing 50 and a front housing 52 appropriately connected to each other in a T-shaped relation. Housing 52 may typically be two inches wide and thus adequately provides an internal storage compartment 54 (see FIG. 6) for the previously noted typical controls of a radio, such as the volume knob 32 and station selection knob 34, said knobs, however, being advantageously laterally in displaced location relative to the front opening 20 of main housing 50. Located within the area 20 may be a cassette opening 36 which, if desired, can be of an enlarged dimension than the prior art opening of the front mounting radio of FIG. 2. For purposes of understanding the inventive contribution, it is important to note that because there is a front housing 52 which bounds a component-storage area 54 not all of the components of the radio have to be stored in the main housing 50 and for this reason the rearward extent of this housing can be shortened to an optimum size of four inches in its dimension L2. Thus, as compared with the prior art dimension L1, there is less space that has to be provided to accommodate the improved radio 10 of FIGS. 3, 6 rearwardly of the dashboard 12, a feature which perhaps can be best appreciated by a comparison of FIGS. 5 and 6.

Another, and perhaps even more important feature of the inventive radio of FIGS. 3, 6, is attributable to use of the storage compartment 54 of the front housing 52 to mask the presence of the mounting bolts 22, 24. That is, housing 50 is intended to be projected through the dashboard opening 14 thus bringing the front housing 52, and more particularly the portions thereof extending laterally of housing 50 into adjacent position against the dashboard 12. In accordance with the present invention it is contemplated that in the positioning of housing 52 adjacent the dashboard 12 that openings 40 in this housing will align with the dashboard bolt-sized openings 28. Next it is contemplated that the mounting bolts 22 and 24 will be inserted through the openings 40 so that they project on opposite sides of the front housing 52. Attached to these projecting ends are the same previously noted butterfly connectors 42 which, also as previously noted, are compressed so that they can be eased through the openings 28. Once on the other side of these openings, the connectors 42 are spring-biased open which then permits the installer to rotate the bolts 22 and 24 thereby drawing up on the connectors 42 until the same are firmly engaged to the rear surface of the dashboard 12. The condition which then exists is illustrated in FIG. 6 in which the legs 56, 58 of each of the connectors 42 will be understood to be in firm engagement against the rear surface of the dashboard 12, as at 60.

One very significant difference between the mounted condition of the radio 10 in FIG. 6 as compared to that of FIG. 5 is that the head of each mounting bolt, bolt 24 and its head 62 being illustrative in FIG. 6, is disposed in a recess 64 appropriately formed in front wall 66 of the front housing 52. Thus, the bolt head 62 is seated against the bottom wall of the recess 64 which bounds the opening 40 so that it can bear against this wall in cooperation with the legs 56, 58 of connector 42 to thereby rigidly hold the improved radio 10 hereof in place in its mounted condition supported on the dashboard 12, while said head 62 is further advantageously located within the recess 64 so that its presence can be effectively masked from view. More particularly, one preferred way of doing this is to use a plug 68 which is sized to be frictionally inserted in each of the recesses 64 and thus make access to the mounting bolt head 62 difficult unless such access is authorized and the party has an appropriate tool for removal of the plug 68.

In summary therefore, the improved radio 10 of FIGS. 3, 6 is an effective front-mounting radio, i.e. a radio mounted from the same readily accessible starting location from which it is operated, whereas the radio of FIGS. 1A, 1B is not. Moreover, unlike the radio of FIG. 2, it is not susceptible to theft. Among other advantages, the radio of FIG. 3 over both types of prior art radios discussed herein has an optimum reduced rearwardly extending dimension L2 in its main housing 50 due to the fact that it also includes the front housing 52 capable of storing some of the radio components. Further, said front housing 52, as just noted, constitutes an advantageously used compartment-bounding structure for the internal placement of the mounting bolts 22 and 24 which bolts, because of their internal storage condition, cannot be readily tampered with which could thus lead to the unauthorized removal of the radio.

As used herein, it will of course be understood that the reference to "radio" also contemplates an embodiment including a cassette player, and other such embellishments such as AM and FM knobs, touch controls, and the like. In other respects as well, it will be understood that a latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. For a vehicle having a dashboard bounding an opening for mounting a radio in an accessible position for being operated from within said vehicle, an improved radio adapted to be mounted in said dashboard mounting opening from said radio-operating location within said vehicle, said radio comprising wall means bounding two separate compartments operatively arranged in T-shaped relation to each other for housing the operating components of said radio, at least two spaced apart radio-mounting bolts extending rearwardly from one said compartment in parallel relation on opposite sides of the other said compartment for completing an attachment of said housing to said dashboard while said other compartment between said bolts has an operative position projected rearwardly through said dashboard mounting opening, said radio-mounting bolts having gripping heads thereon operatively located internally within indentations formed in the front wall of said one compartment for receiving in seated relation each said bolt head, and plugs frictionally disposed in said indentations in covering relationship over said bolt heads, whereby access to said mounting bolt heads incident to any unauthorized tampering therewith is effectively minimized.

2. An improved vehicle radio adapted to be mounted from within said vehicle to the dashboard thereof as claimed in claim 1, wherein said dashboard has additional openings sized to allow said bolts to be projected therethrough on opposite sides of said mounting opening, and there is operatively disposed on each said bolt a cooperating member for engaging the rear surface of said dashboard, to thereby complete the attachment of said radio to said dashboard.

3. An improved vehicle radio adapted to be mounted from within said vehicle to the dashboard thereof as claimed in claim 2, wherein the projected length portion of each said bolt is threaded, and each said cooperating member is threadably engaged thereto, whereby rotation of said bolt is effective to move said cooperating member into gripping engagement with said dashboard rear surface.

* * * * *